Jan. 8, 1924.
J. A. STREET
DIFFERENTIAL MECHANISM
Filed June 23, 1921
1,480,228
2 Sheets-Sheet 1
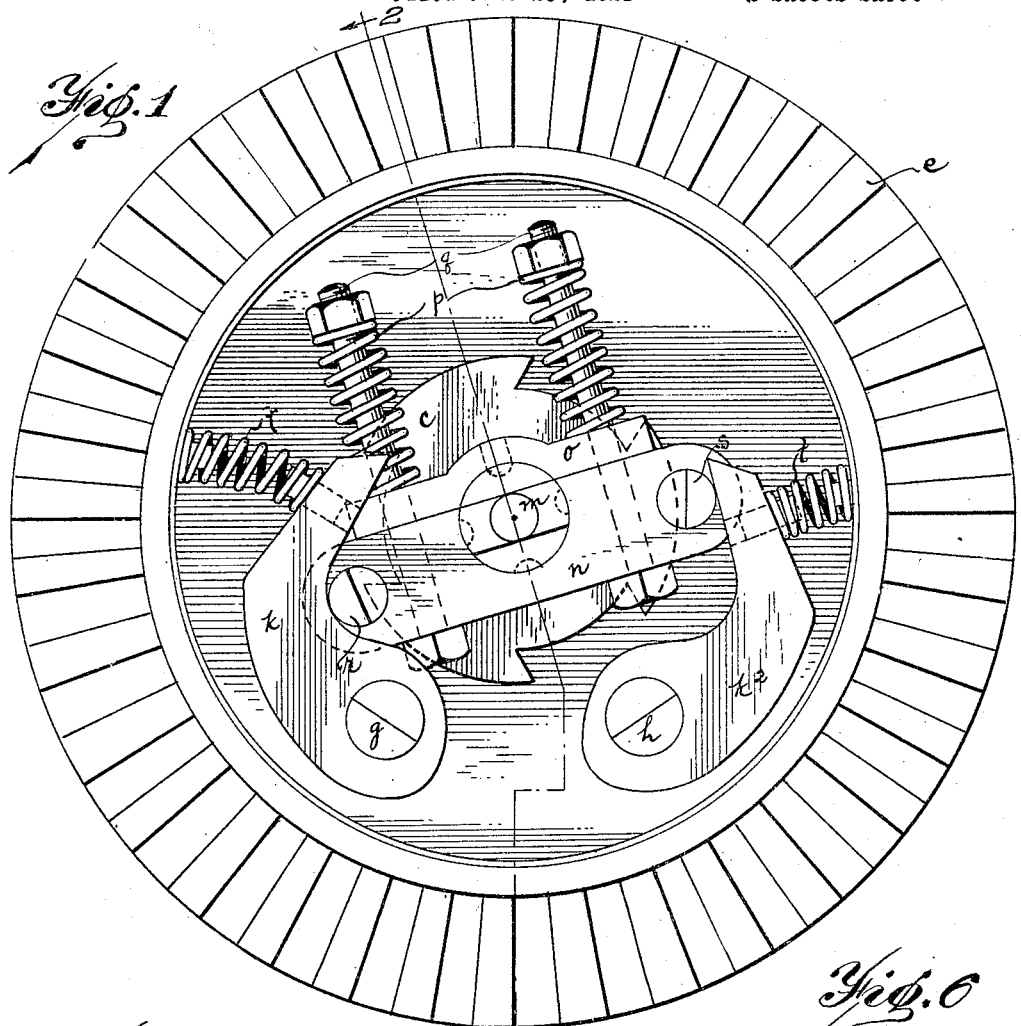
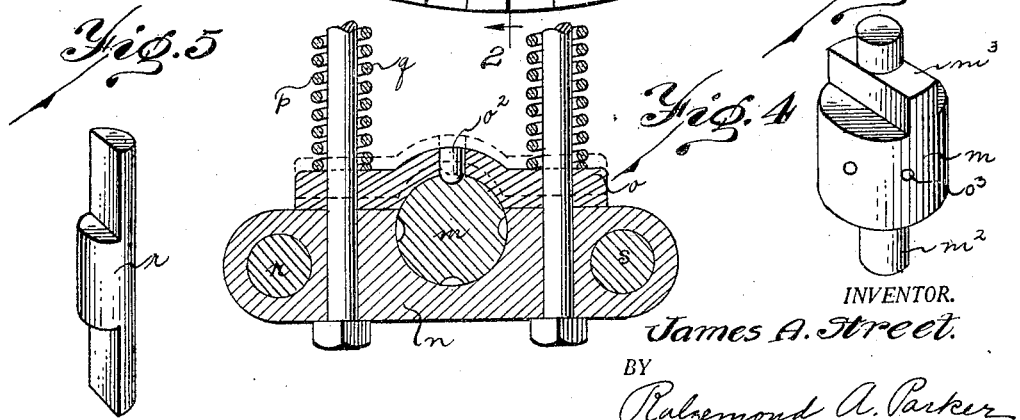
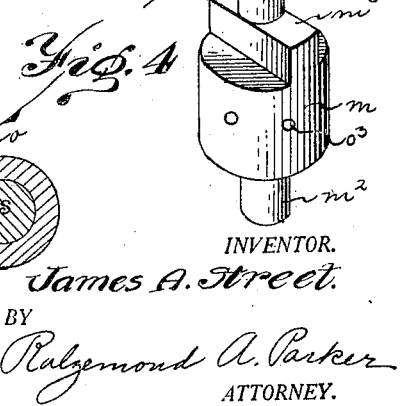
INVENTOR.
James A. Street.
BY
Ralzemond A. Parker
ATTORNEY.

Jan. 8, 1924.

J. A. STREET

DIFFERENTIAL MECHANISM

Filed June 23, 1921

INVENTOR.
James A. Street
BY
Ralzemond A. Parker
ATTORNEY.

Patented Jan. 8, 1924.

1,480,228

UNITED STATES PATENT OFFICE.

JAMES A. STREET, OF PONTIAC, MICHIGAN, ASSIGNOR OF ONE-HALF TO HUGO C. ZEITZ, OF DETROIT, MICHIGAN.

DIFFERENTIAL MECHANISM.

Application filed June 23, 1921. Serial No. 479,867.

*To all whom it may concern:*

Be it known that I, JAMES A. STREET, a citizen of the United States, residing at Pontiac, county of Oakland, State of Michigan, have invented a certain new and useful Improvement in Differential Mechanism, and declare the following to be a full, clear, and exact description of the same, such as will enable others skilled in the art to which it pertains to make and use the same, reference being had to the accompanying drawings, which form a part of this specification.

My invention relates to a new and improved type of differential mechanism adapted for use either for light or heavy motor vehicles.

An object is to provide a differential mechanism capable of positively driving each driven wheel at the engine transmitted speed. It will not be possible with my mechanism for one wheel to spin while the other wheel remains stationary, although it is so constructed that either wheel may overrun the other driven wheel.

A further object is to provide such a differential mechanism of simple, inexpensive, sturdy construction adapted to act positively on both driven wheels.

A further object is to provide new and improved mechanism for clutching and declutching the driven axle sections and controlling means for such clutching mechanism and means, whereby such controlling means may be actuated to reverse the clutching mechanism by virtue of the resistance of the driven wheels.

These and other objects, together with details of construction, will more fully appear from the within description, appended claims and accompanying drawing, in which:

Figure 1 is an end elevation with one axle section removed.

Fig. 4 is a section through my pawl-actuating member.

Fig. 5 is a perspective of one of the pawl-actuating pins.

Fig. 6 is a perspective of the spindle upon which the pawl-actuating member is mounted.

Figure 2:
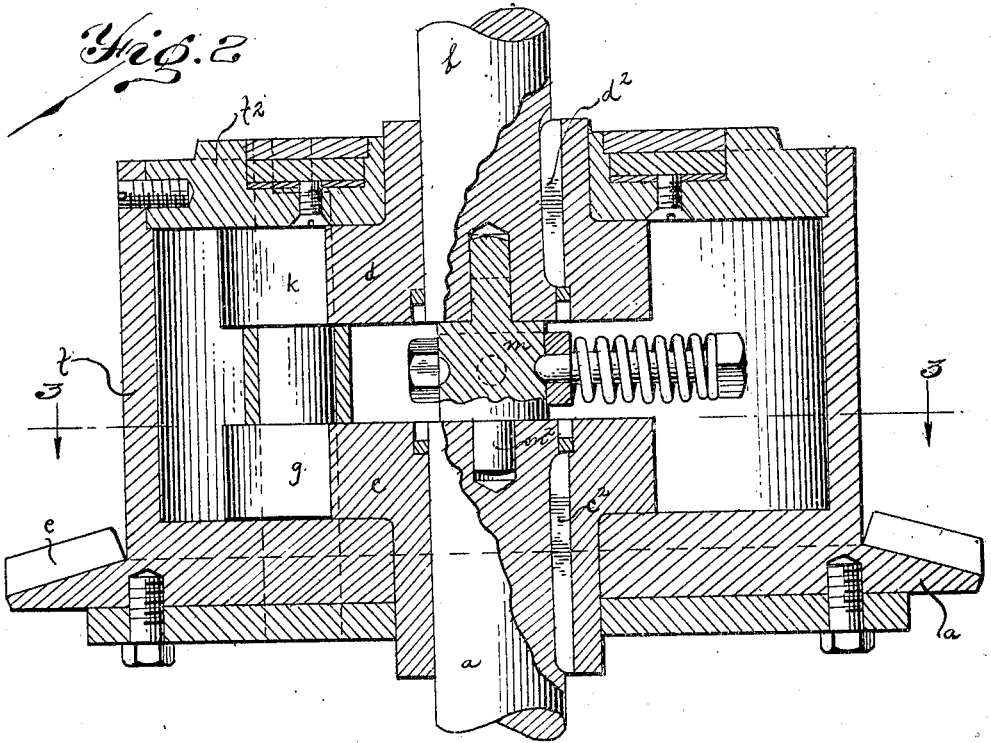
Fig. 2 is a cross-section taken on the line 2—2 of Fig. 1.
Figure 3:
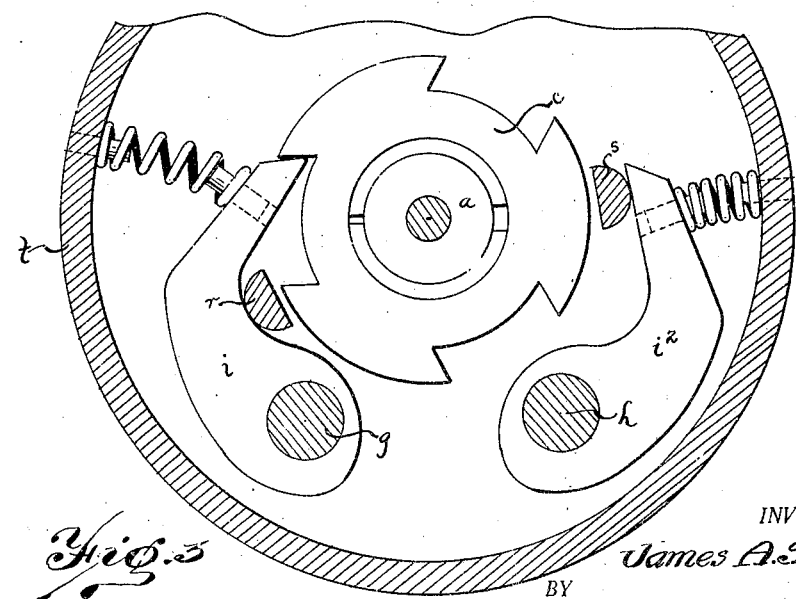
Fig. 3 is a cross-section partly broken away, taken on the line 3—3 of Fig. 2.

In the drawings, let $a$ and $b$ indicate aligned axle sections provided at their outer ends with traction wheels, not shown in the drawing, and carrying at their adjacent ends toothed disks $c$ and $d$, respectively which are splined thereto, as at $c^2$, $d^2$, respectively, to rotate therewith. $e$ is the driven ring-gear adapted to be suitably driven from the engine, which is shown as mounted for rotation upon the extended hub of the toothed disk $c$ and which carries an annular flange $f$ provided with an end closure plate $f^2$, which flange and plate form together with the gear a hollow casing adapted to revolve as one piece with the ring-gear. It is obvious the ring-gear might be mounted on the mid-section of the casing rather than at one side thereof, which might be a preferred construction for heavy vehicles.

Suitably mounted within the casing upon spindles $g$ and $h$ are two pairs of dogs or pawls, one pair for each toothed disk. Pawls $i$ and $i^2$, mounted upon shafts $g$ and $h$ respectively, are adapted to engage toothed disk $c$ to rotate the same as one piece with the ring-gear, either forward or in reverse, as the case may be. Pawls $k$ and $k^2$, mounted upon shafts $g$ and $h$, respectively, are adapted to engage toothed disk $d$ causing the the same to rotate with the ring-gear. Obviously but one pawl of each pair could be locked with a toothed disk at a time and means are provided so that similar pawls of both pairs operate in unison to engage their respective toothed disks for rotation. It will be seen that, though each toothed disk is engaged to rotate with the gear at engine speed, individual toothed disks, and therefore the axle sections may individually overrun the ring-gear.

I have provided new and improved means to engage the pawls to insure reversal of rotation of the toothed disks upon reversing the rotation of the ring-gear, which means comprises a spindle $m$, shown in perspective in Fig. 6, opposed ends of which spindle are received in adjacent ends of the axle sections, as shown in Fig. 2. The spindle $m$ is journaled at the end $m^2$ in axle section $a$, in such a manner as to be free for rotation relative to said section, but the flat portion $m^3$ of the spindle is received in the axle section $b$, so that the spindle rotates with said axle section. This spindle carries a pawl-actuating part $n$ mounted thereon to rotate therewith, but adapted to resistingly permit of relatively independent rotation of the spindle. This part $n$ is locked releasably to the spindle by means of an interiorly radially-extending, rounded lug $o^2$ carried by the strip $o$, which lug is adapted to be received within the concavities $o^3$ arranged circumferentially around the spindle, as shown. This strip $o$ is held resistingly in engagement with the spindle by means of springs $p$ which encircle the bolts $q$. This member $n$ carries at opposite ends transversely-extending arms or pins $r$ and $s$, similar in shape and which extend beyond the member $n$ and overhang the toothed disks $c$ and $d$, so as to engage the pawls in such a manner that one pawl of each pair is constantly held out of engagement with its respective toothed disks. I have provided means to hold each pawl yieldingly inward towards its respective toothed disk in the form of spiral springs $t$, opposed ends of which are mounted over studs carried by the pawl member and the casing wall respectively, and which exert inward, yielding tension on the pawl member, tending to hold the same toward the toothed disk.

In the operation of the device, when the ring gear is rotating in a clockwise direction, as shown in Fig. 1, and both of the driven wheels of the vehicle are traveling straight ahead, pawls $i$ and $k$ are engaged with toothed disks $c$ and $d$ respectively, and such toothed disks and their respective axle sections are being driven at the engine speed, or as one piece with the ring-gear. However, if the path of travel of the vehicle turns so that the wheel carried by the axle section $b$ is made to travel a greater distance than the other wheel carried by axle section $a$, the section $b$ overruns the section $a$, and the toothed disks $d$ overruns the ring-gear and the pawl $i$.

In the overrunning of the axle section $b$, above referred to, as the spindle $m$ is engaged thereto to rotate therewith, the spindle $m$ must necessarily rotate within the pawl-engaged member $n$ against the resistance of springs $p$, as the pawl-engaging member $n$ is held by virtue of its engagement with the pawls to rotate with the ring-gear. In the overrunning of the opposite axle section $a$, however, such axle section revolves freely about the end $m^2$ of the spindle.

Upon the reversal of rotation of the ring-gear, so that it travels in a counter-clockwise direction, the pawls $k$ and $i$ are rotated back out of engagement with the toothed disks $d$ and $c$. The pawl-actuating member $n$, with the pins $r$ and $s$, being engaged through its supporting spindle $m$ with the axle section $b$, is yieldingly held by such section against picking up the reverse rotation of the ring-gear and momentarily remains stationary or travels with the axle during this initial impulse of reversal or rotation and because of the shape of the pawls themselves, as they travel for a limited arc of rotation with the ring gear over the pins $r$ and $s$, pawls $k$ and $i$ are forced back against the resistance of the springs $t$ and pawls $i^2$ and $k^2$ are released, due to the tension of their springs so as to be brought into engagement with their respective toothed disks, thereby picking such springs up for rotation with the ring-gear in their reverse direction.

It will be seen, however, that the construction is such that the pawl-actuating part $n$ must rotate at all times as one piece with the ring-gear, except for this limited permitted lag in picking up the rotation of the ring-gear upon reversal of the rotation which reverses the engagement of the pawls with their respective toothed disks.

What I claim is:

1. In a differential, an axle divided into two sections, toothed disks secured to adjacent ends of said sections to rotate therewith, a rotatably-driven ring-gear encircling said toothed disks, a pair of pawls for each toothed disk carried by said gear adapted to engage said toothed disks to rotate as one piece with said gear but in such a manner as to permit either toothed disk to overrun said gear, pawl-controlling means comprising a spindle journaled freely in one axle section and engaged with the other section to rotate therewith, and a pawl-engaging portion carried by the spindle releasably engaged thereto to rotate therewith, said pawl-engaging portion adapted to engage said pawls in such a manner that one pawl of each pair is held out of engagement with its toothed disk permitting the other pawl in pair to engage the toothed disk for rotation.

2. In a differential, in combination, a pair of aligned axle sections adjacent ends of which carry toothed disks to rotate therewith, a driven ring-gear encircling said toothed disks, a pair of pawls for each toothed disk carried by said ring-gear to rotate therewith, said pawls adapted to engage said toothed disks in such a manner that the toothed disks rotate as one piece with the ring-gear, but are individually permitted to overrun said gear, pawl-controlling means comprising a spindle carried by one axle section to rotate therewith and a pawl-engaging portion mounted on the spindle and adapted to engage said pawls in such a manner that one pawl of each pair is at all times held out of engagement with said toothed disks, said pawl-engaging portion so mounted on the spindle as to normally rotate therewith but permitted to resistingly rotate independently about the spindle on which it is mounted.

3. In a differential mechanism for motor vehicles, in combination, an axle comprising a pair of aligned axle sections, a toothed disk carried by each axle section to rotate therewith, a rotatably driven ring gear, a plurality of pawls carried by said gear to rotate therewith, said pawls adapted to engage said toothed disks to rotate at all times with the gear while permitting each toothed disk to overrun the gear, pawl-controlling means comprising a spindle having a freely rotatable bearing in one axle section and so engaged in the opposite axle section as to rotate therewith at all times, and a pawl-engaging member mounted on such spindle to normally rotate therewith but adapted to be resistingly rotated thereon.

4. In a differential mechanism for motor vehicles, in combination, a pair of aligned axle sections, a toothed disk carried by each section to rotate therewith, a driven ring gear, two pairs of pawls pivoted to rotate with said gear adapted to be individually moved into and out of engagement with such toothed disks to cause the same to rotate at all times with the gear while permitting each toothed disk to overrun the gear, pawl-controlling means comprising a spindle freely journaled in one axle section and having a bearing in the other axle section to rotate therewith, and a pawl-engaging member mounted on said spindle to normally rotate therewith but adapted to resistingly permit independent rotation of the spindle therein, said pawl-engaging member adapted at all times to hold one pawl in each pair out of engagement with its toothed disk while permitting the other pawl in a pair to engage said toothed disk for rotation.

5. In differential mechanism, a driving member, an axle consisting of two aligned sections, couplers to releasably engage each axle section with said driving member to rotate therewith while permitting each section to overrun said driving member, coupler control mechanism comprising a spindle interposed between said axle sections freely rotatable with one axle section but engaging the other axle section to rotate therewith, and a member carried by said spindle to normally rotate therewith but adapted to permit the spindle to resistingly rotate relative thereof, said member adapted to control the driving engagement and release of the couplers with said axle sections.

6. In differential mechanism, a driving member, an axle divided into two aligned sections, clutch members to engage each section with the driving member to rotate therewith while permitting each section to overrun said driving member, and clutch control devices interposed between said axle sections comprising a part rotatable with one axle section but adapted for rotation relative the other section, a member mounted on said part to normally rotate therewith but capable of rotation relative thereof, said member adapted to control the engagement and disengagement of said clutch members.

In testimony whereof, I sign this specification.

JAMES A. STREET.